United States Patent
Heydecke et al.

(10) Patent No.: US 6,379,517 B1
(45) Date of Patent: Apr. 30, 2002

(54) METHOD AND DEVICE FOR ELECTRODIALYTIC REGENERATION OF AN ELECTROLESS METAL DEPOSITION BATH

(75) Inventors: Jens Heydecke; Rainer Born; Werner Richtering; Manfred Blaschke; Alexander Kraft; Maja Wunsche, all of Berlin (DE)

(73) Assignee: Atotech Deutschland GmbH (DE)

( * ) Notice: Subject to any disclaimer, the term of this patent is extended or adjusted under 35 U.S.C. 154(b) by 0 days.

(21) Appl. No.: 09/673,078

(22) PCT Filed: Sep. 27, 1999

(86) PCT No.: PCT/DE99/03186

§ 371 Date: Dec. 4, 2000

§ 102(e) Date: Dec. 4, 2000

(87) PCT Pub. No.: WO00/23637

PCT Pub. Date: Apr. 27, 2000

(30) Foreign Application Priority Data

Oct. 15, 2000 (DE) ......................................... 198 49 278

(51) Int. Cl.[7] ................................................ B01D 61/44
(52) U.S. Cl. ....................... 204/522; 204/523; 204/633; 204/634
(58) Field of Search ................................ 204/522, 523, 204/633, 634

(56) References Cited

U.S. PATENT DOCUMENTS

| | | |
|---|---|---|
| 4,324,629 A | 4/1982 | Oka et al. |
| 5,221,328 A | 6/1993 | Bishop et al. |
| 5,419,821 A | 5/1995 | Vaughan |
| 5,716,512 A * | 2/1998 | Vaughan ...................... 205/488 |
| 6,200,448 B1 * | 3/2001 | Richard ....................... 205/488 |
| 6,245,389 B1 * | 6/2001 | Horikawa et al. ........... 427/438 |

FOREIGN PATENT DOCUMENTS

| | | |
|---|---|---|
| DE | 43 10 366 C1 | 10/1994 |
| EP | 0 604 968 A2 | 6/1994 |
| EP | 0 787 829 A1 | 6/1997 |

OTHER PUBLICATIONS

Title: Continuous In–Situ Regeneration of Electroless Nickel Baths During Powder Plating Author: C.D. Iacovangelo pp. 77–82, Sep. 1995.
Publication: Electroless Nickel 89 Title: Extension of Bath Life by Electrodialysis Method at Electroless Nickel Plating Bath Authors: Yoshio Kuboi and Ryuji Takeshita pp. 16–1 thru 16–15, (1989) No Month.

* cited by examiner

Primary Examiner—Arun S. Phasge
(74) Attorney, Agent, or Firm—Paul & Paul (57) ABSTRACT

A method and a device for the regeneration of an electroless metal deposition bath containing hypophosphite ions by electrodialysis is described. The method according to the invention and the device differ from the prior art in that the bath solution is led simultaneously through diluate compartments in a second electrodialysis unit having cathodes and anodes, which compartments are separated from concentrate compartments in the second electrodialysis unit on the cathode side by monoselective anion-exchange membranes and on the anode side by anion-exchange membranes, the diluate compartments and the concentrate compartments in the second electrodialysis unit being disposed alternately to one another.

13 Claims, 3 Drawing Sheets

METHOD AND DEVICE FOR ELECTRODIALYTIC REGENERATION OF AN ELECTROLESS METAL DEPOSITION BATH

This application is a 371 of PCT/DE99/03186 filed Sep. 27, 1999.

The invention relates to a method and a device for regenerating by electrodialysis an electroless metal deposition bath, especially an electroless nickel deposition bath.

The electroless metal-plating of workpieces has been known for a long time. For example, sanitary fittings made of plastics material are provided with metal layers in order to obtain a specific aesthetic appearance, or specific workpieces consisting of metal, in order to improve their serviceability, for example the wear-resistance or corrosion behaviour. Thus, in machine-building, parts which are mechanically heavily loaded receive resistant coatings comprising a largely amorphous nickel/phosphorus alloy layer in order to increase the resistance to abrasion, for example of bearing shells on moveable parts. In oil production, metal parts used in the off-shore domain are coated with a nickel/phosphorus layer of this type in order to improve the material resistance to chemical influences.

Electroless plating with metals is based on an autocatalytic process in which dissolved metal ions are reduced to metal by means of a reducing agent located in the deposition solution, and deposited on the workpiece to be coated. In this case, additional components are often incorporated into the metal layer, for example phosphorus. As well as nickel, copper can also be deposited by this method.

For the deposition of nickel/phosphorus layers, electrolytic and electroless methods can basically be used. Electrolytic methods are admittedly easier to handle; however they have the disadvantage that layers of uniform thickness can only be obtained if the parts to be coated have a simple geometry. The electrolytic metallisation of workpieces which have a complex geometry, for example curvatures, holes or undercuts, leads to an uneven layer thickness and thus in many cases to intolerable local fluctuations in the plating result. Moreover, the metal layers deposited in an electroless manner often have more advantageous mechanical properties than metal layers deposited by electrolytic means. For this reason, electroless methods are very frequently used for plating.

Electroless metal deposition is represented below in the example of electroless nickel deposition with simultaneous incorporation of phosphorus into the layer. In this process, a deposition solution is used, for example, which contains sodium hypophosphite as the reducing agent for nickel ions, as well as nickel ions, for example as nickel sulphate. The deposition reaction takes place according to the following reaction equation:

$NiSO_4 + 6\ NaH_2PO_2 \pm Ni + 2\ H_2 + 2P + 4NaH_2PO_3 + Na_2SO_4$

Thus in this reaction, dissolved nickel and hypophosphite ions are constantly consumed, whilst the concentration of orthophosphite ($H_3PO_3^-$) increases as an oxidation product. Moreover the counterions of the nickel cations and hypophosphite anions accumulate in the form of $Na_2SO_4$.

Thus, methods of this type have the disadvantage that the process management is complicated in many cases and a large number of monitoring operations has to be carried out in order to achieve constant deposition conditions. In addition to this, the service life of the electroless deposition baths is limited. In metal deposition, the reducing agent and the metal ions are used up which have to be continually added as the method is carried out, in order to make available an approximately constant content of available reducing agent and available metal ions within a narrow band width. Since the reducing agent and the salts containing the metal ions leave behind, during the deposition reaction, products which accumulate in the deposition bath, the service life of the bath is inevitably limited. For example, the metal ions are added to the bath in the form of salts, such that disturbing anions, such as sulphate ions accumulate in the bath. The same is true for orthophosphite ions ($H_2PO_3^-$) which form in the bath through oxidation of hypophosphite ions.

The age of a bath is generally quoted in metal turnover (MTO). 1 MTO corresponds to the amount of deposited metal from the bath which corresponds to the initially used concentration of the metal ions in the bath, respectively in relation to the total volume of the bath. Generally, the degradation products in the bath reach such a high concentration after 6 to 10 MTO that the quality and deposition speed of the metal are no longer within tolerable ranges. Therefore baths of such an age are not used again. A new bath must be started and the spent one must be thrown away. What is disadvantageous is that the necessary disposal of the baths and the required new charging of fresh baths lead to high costs and considerable damage to the environment. For this reason, different methods have been proposed by means of which the service life of baths of this type can be extended.

In U.S. Pat. No. 5,221,328, a method for extending the service life of electroless nickel baths is described, by means of which method orthophosphite which has been produced in a nickel/phosphorus deposition bath can be precipitated as a metal salt and separated. Yttrium and lanthanides can be considered as precipitants. However, the necessary chemicals for this are extremely expensive. Moreover, the dissolved components of these additives, remaining in the bath, can impair the quality of the metal coatings.

In "Plating and Surface Finishing", September 1995, pages 77 to 82, it is proposed by C. D. Iacovangelo that the disturbing precipitation of nickel orthophosphite be prevented through the addition of complexing agents. By this means, the concentration of dissolved free nickel ions is reduced.

In the ENVIRO CP-process of the company Martin Marietta, U.S.A., the disturbing components in the bath are separated by means of adsorption on ion-exchange resins. For the complete separation and regeneration of the deposition bath, a complex process is carried out in which a plurality of different ion-exchange columns and containers for diverse process liquids are needed.

Y. Kuboi and R. Takeshita describe a method of separating the undesired bath components by electrodialysis (Electroless Nickel Conference 1989, Proceedings, Prod. Finishing Magazine, 1989, pages 16–1 to 16–15). In this method, the electroless nickel bath is led as so-called diluate through an electrodialysis cell. The diluate compartment in the electrodialysis cell is, for this purpose, separated on the anode side by an anion-exchange membrane from the anode compartment which is in contact with the anode, and on the cathode side by a cation-exchange membrane from the cathode compartment which is in contact with the cathode. These two last-mentioned compartments are also referred to as concentrate compartments. The undesired sulphate and orthophosphite ions in the deposition bath are transported into the anode compartment and the undesired sodium ions, which come from the sodium hypophosphite used, are transferred into the cathode compartment. In laboratory tests, however, it has emerged that, in addition to the undesired sulphate, orthophosphite and sodium ions, the bath constituents important for the deposition process, namely the nickel and hypophosphite ions and the organic complexing agents (mostly carboxylic acids or anions thereof), are transported into the concentrate compartments.

In DE 43 10 366 C1, a method of regenerating electroless nickel/phosphorus baths by electrodialysis is described. The nickel/phosphorus bath to be regenerated is to this end led through a compartment in an electrodialysis cell which is separated from the adjacent compartments both on the cathode side and on the anode side by respectively one anion-exchange membrane (diluate compartment). Through the application of an electrical field, ortho- and hypophosphite ions are transferred into the concentrate compartment lying on the anode side of the diluate compartment. This solution is then transported into the cathode compartment which is in contact with the cathode. Hypophosphite can by transference pass from there into the diluate compartment again, whilst orthophosphite is reduced to hypophosphite at the cathode and the hypophosphite produced is then also to be transferred into the diluate compartment. However, it has emerged in tests that this reduction reaction does not in fact take place. Furthermore the parallel connection of a large number of the quoted cells is proposed. Even with this cell, the disadvantage is not overcome which is inherent in the method described by Y. Kuboi and R. Takeshita. Moreover, sulphate and sodium ions also accumulate in this solution.

In U.S. Pat. No. 5,419,821, too, an electrodialytic method of regenerating electroless metallisation baths is described. In a similar manner to DE 43 10 366 C1, hypophosphite and orthophosphite are transferred via an anion-exchange membrane into a concentrate compartment on the anode side and thus separated. In this case, too, the concentrate solution on the anode side is transferred into the cathode compartment, such that hypophosphite can from there reach the diluate compartment again. orthophosphite is precipitated through the addition of magnesium or calcium salts to the solution which flows through this compartment, and in this way removed from the overall process. What is disadvantageous, however, is that disturbing sodium and sulphate ions cannot be removed from the nickel bath solution.

In order to overcome the disadvantages of the methods described above, a method for the electrodialytic regeneration of electroless nickel/phosphorus baths was proposed in EP 0 787 829 A1, in which the method is used in two different variants. In each of the variants, this method is operated discontinuously. The one variant represents a two-stage method in which the spent deposition solution is first led into the diluate compartment of an electrodialysis cell, which is delimited from two concentrate compartments by an anion-exchange membrane on the side facing the anode and by a monoselective cation-exchange membrane on the side facing the cathode. Monoselective ion-exchange membranes differ from normal ion-exchange membranes in that they do not allow singly charged ions to pass, nor even ions which are multiply charged. In the first stage of the method, sodium, hypophosphite, orthophosphite, sulphate and carboxylic acid ions are transferred to the adjacent compartments, whilst nickel ions remain in the diluate compartment. Then the respective solutions are led into a second electrodialysis cell in which the concentrate compartment is disposed between two diluate compartments and separated from the latter on the anode side by a monoselective anion-exchange membrane and on the cathode side by a cation-exchange membrane. In this case, the hypophosphite and carboxylic acid anions and the sodium cations are transferred into the diluate compartment again, but not the orthophosphite and sulphate ions. From the balance, therefore, the orthophosphite and sulphate ions are removed but not the sodium ions. Since the charge balance is guaranteed in each individual method step, the total amount of the orthophosphite and sulphate ions cannot be removed since the proportion of anionic counterions corresponding to the sodium ions remaining in the diluate compartment must also remain in the diluate compartment. Thus the efficacy of the separation is considerably impaired.

In the second variant, which is designed as a single-stage method, the bath solution is placed in the cathode compartment of an electrodialysis cell comprising three electrolyte compartments, the central compartment being separated from the other compartments on the anode side by a monoselective anion-exchange membrane and on the cathode side by a monoselective cation-exchange membrane. The solution contained in the anode compartment is led into the cathode compartment. The bath solution is first led into the cathode compartment. Hypophosphite and orthophosphite ions are supposed to be transferred into the central compartment. However, this appears impossible since a cation-exchange membrane is disposed between the two compartments. For this reason, it is not clear how the method can be realised.

The main problem of the known devices and methods accordingly consists in guaranteeing as effective and complete removal as possible of disturbing ions from the nickel/phosphorus deposition solution. These substances are in particular sodium, orthophosphite and sulphate ions. Moreover the method should be able to be carried out as continuously as possible during the operation of the bath and only require one method step, in order to minimise the outlay. The problem underlying the present invention is, therefore, to avoid these disadvantages.

Accordingly, the invention relates to a method and a device for regenerating by electrodialysis electroless metal deposition baths containing hypophosphite ions as the reducing agent, especially baths for depositing nickel/phosphorus layers, and proceeds from the fact that the bath solution is led through diluate compartments in a first electrodialysis unit having cathodes and anodes, which compartments are separated from concentrate compartments in the electrodialysis unit on the cathode side by monoselective cation-exchange membranes and on the anode side by anion-exchange membranes. The bath solution is also led simultaneously through diluate compartments in a second electrodialysis unit, connected hydraulically in parallel to the first unit and having cathodes and anodes, which compartments are separated from concentrate compartments in the second electrodialysis unit on the cathode side by monoselective anion-exchange membranes and on the anode side by anion-exchange membranes. In both the electrodialysis units, the diluate compartments and the concentrate compartments are disposed respectively alternately to one another.

In the simplest embodiment of the invention, the device has the following equipment features:
  a. a first electrodialysis unit, containing two concentrate compartments and a diluate compartment disposed between same as electrolyte compartments, the diluate compartment being separated on the cathode side from the one concentrate compartment by a monoselective cation-exchange membrane and on the anode side from the other concentrate compartment by an anion-exchange membrane,
  b. a second electrodialysis unit, containing two diluate compartments and a concentrate compartment disposed between same as electrolyte compartments, the concentrate compartment being separated on the cathode side from the one diluate compartment by an anion-exchange membrane and on the anode side from the other diluate compartment by a monoselective anion-exchange membrane, furthermore . in each electrodialysis unit at least one cathode and at least one anode and d. a power supply for the cathodes and the anodes.

The spent bath solution, which as well as the valuable substances in the bath, i.e. hypophosphite, carboxylic acid and nickel ions, also contains disturbing accompanying substances, namely, for example, orthophosphite, sulphate and sodium ions, is led simultaneously into all the diluate compartments of the two electrodialysis units. Through transference, in the first electrodialysis unit all the anions are transferred from the diluate compartment into the concentrate compartments disposed on the anode side of same, and the sodium ions into the concentrate compartments disposed on the cathode side of same, whilst nickel ions remain in the diluate compartment. In the second electrodialysis unit, only the monovalent anions, namely hypophosphite and carboxylic acid ions, are transferred from the concentrate compartments into the diluate compartments on the anode side, whilst in this case the cations contained in the concentrate compartment and the divalent anions, namely orthophosphite and sulphate ions, remain in this compartment.

Since in the first electrodialysis unit a monoselective cation-exchange membrane is used in the diluate compartment on the cathode side, sodium ions are transferred selectively from the diluate compartment into the concentrate compartment. Nickel ions cannot escape from the diluate compartment because of the special arrangement of the membranes. Moreover, through an anion-exchange membrane being used in both electrodialysis units in the diluate compartment on the anode side, hypophosphite is admittedly transferred from the diluate compartment into the concentrate compartment, but also orthophosphite and sulphate. The loss of hypophosphite and carboxylic acid ions from the diluate compartment is selectively compensated for again, by a monoselective anion-exchange membrane being disposed in the second electrodialysis unit in the concentrate compartment on the anode side, such that these ions are selectively transferred from the concentrate compartment to the diluate compartment.

Thus, in the balance, during continuous circulation of the solution through the two electrodialysis units, only the sodium, orthophosphite and sulphate ions are removed from the spent solution, whilst the valuable substances remain in the solution. With the method according to the invention and the device, the optimal efficiency of the separation of disturbing bath constituents and thus the solution of the problem underlying the invention is consequently achieved.

By both electrodialysis units being operated hydraulically in parallel and not in a sequential method, electroneutrality must be guaranteed in respect of the ion transport only within the total arrangement. This means that only in respect of the total arrangement must the amount of anionic substances, which pass the membranes in the anodic direction, be equal to the amount of cationic substances which pass the membranes in the cathodic direction. The bath solution circulates continuously again and again through both electrodialysis units, such that the disturbing substances, which are at first only partially separated, are gradually completely separated. For this reason, disadvantageous effects such as those connected with the two-stage method of EP 0 787 829 A1 are not observed.

In order to achieve, in particular, continuous operation of the electrodialytic method, a concentrate solution is led simultaneously through the concentrate compartments. This concentrate solution contains the disturbing substances removed substantially through enrichment from the spent bath solution. So that the concentration of these disturbing substances does not rise above a critical value, the concentrate solution is diluted continuously or at least from time to time (intermittently). Moreover, sodium hydroxide can be added to this solution. This addition renders possible an effective separation of the orthophosphite ions from the hypophosphite ions, by an optimal pH value of the concentrate solution being set above roughly 8.5 (forming $HPO_3^{2-}$ from $H_2PO_3^-$)

What is guaranteed in this way is that the disturbing bath constituents can be continuously removed from the spent solution. Otherwise, these substances would accumulate in the concentrate solution above a critical value and lead to a reduction in the separation effect, since the disturbing substances could in these circumstances only be inadequately transferred into the concentrate solution.

In order to exploit the advantages of the electrodialytic method, preferably in the first electrodialysis unit respectively at least two diluate compartments and at least three concentrate compartments are disposed alternately to one another, and in the second electrodialysis unit respectively at least two concentrate compartments and at least three diluate compartments. In this way, with predetermined dimensions of the ion-exchange membranes, a sufficiently large exchange area for the spent bath solution is made available in the membranes. The larger this exchange surface is, the faster and more effectively the regeneration of the bath can progress also. Therefore, in an optimal configuration for the regeneration arrangement, a large number of diluate compartments and concentrate compartments in the first electrodialysis unit and a large number of diluate compartments and concentrate compartments in the second electrodialysis unit are disposed in respectively alternating sequences to one another. In this way, two stacks of electrolytic cells are created through which the diluate solution is led through the diluate compartments and the concentrate solution through the concentrate compartments. Basically, the two electrodialysis stacks do not have to have the same number of electrolyte compartments. For example, it can be advantageous to provide a larger number of diluate compartments and concentrate compartments in the first electrodialysis unit than in the second electrodialysis unit.

The special arrangement of the ion-exchange membranes results in the concentrate compartments in the first electrodialysis unit being delimited on the cathode side by anion-exchange membranes and on the anode side by monoselective cation-exchange membranes. The anode and the cathode are disposed on the end faces of the electrodialysis stack. The electrolyte compartments in contact with the cathode and the anode are, differently from the given sequence of membranes which separate the respective compartments from one another, are separated from the adjacent electrolyte compartments by cation-exchange membranes. In these outer electrolyte compartments is to be found an electrochemically inert conducting salt solution, for example a sodium sulphate solution. This guarantees that no undesired electrode reactions take place in these compartments, which would lead to destruction of the electrodes or to the formation of undesired reaction products on the electrodes.

In the same manner, the concentrate compartments in the second electrodialysis unit are delimited on the cathode side by anion-exchange membranes and on the anode side by monoselective anion-exchange membranes. In this case too, an anode or respectively a cathode is disposed on the end faces of this second electrodialysis stack. The electrolyte compartments in contact with the cathode and the anode, differently from the given sequence of membranes which demarcate the diluate and concentrate compartments from one another, are separated from the adjacent electrolyte compartments by cation-exchange membranes. In this second case, too, correspondingly inert solutions are to be found in the cathode compartment and the anode compartment, such that no undesired electrode reactions can take place.

The surface ratio of the normal anion-exchange membranes to the monoselective anion-exchange membranes in both electrodialysis stacks and the pH value of the solution led through the concentrate compartments (preferably at least 8.5) determine the degree of loss of anionic valuable substances, i.e. of hypophosphite and carboxylic acid anions.

In a preferred embodiment, the first electrodialysis unit and the second electrodialysis unit are combined in a common electrodialysis stack and disposed in such a manner that a cathode is disposed on only one end face of the common electrodialysis stack, and an anode on the other. To this end, the respective stacks are not electrically insulated from one another. Rather, for this purpose, an anion-exchange membrane is arranged on the boundary surfaces between the stacks to delimit the end concentrate compartment on the cathode side of the first electrodialysis unit from the end diluate compartment on the anode side of the second electrodialysis unit. In this case, the corresponding cathode compartment provided on the end electrolyte compartments is dispensed with, as are the corresponding anode compartment and the associated electrodes. In this case, therefore, only one cathode compartment and one anode compartment are provided on the end faces of the stack, as well as one cathode and one anode there.

In a further preferred alternative embodiment of the invention, the first electrodialysis unit and the second electrodialysis unit are again combined in a common electrodialysis stack; in this case, however, the sequence of the individual electrolyte compartments is so selected that the electrolyte compartments of the one electrodialysis unit, which are aligned towards the cathode, are aligned towards the respectively other electrodialysis stack. Between the two electrodialysis units are disposed a common cathode, and respectively one anode on the two end faces of the common electrodialysis stack. This combination has the advantage that only one stack has to be manufactured. In this case, two power supplies are provided, namely a power supply for the cathode and the one anode and a further power supply for the cathode and the other anode. The electric circuits of the two electrodialysis units can, of course, also be connected in parallel, such that again one power supply is sufficient.

In an alternative embodiment to the above, the reverse sequence of the individual electrolyte compartments is chosen. In this case, the electrolyte compartments of the one electrodialysis unit, which are aligned towards the anode, are aligned towards the respectively other stack of electrolytic cells. Between the two electrodialysis units is disposed a common anode and on the two end faces of the common electrodialysis stack respectively one cathode.

In a further preferred embodiment according to the invention, the bath solution of the deposition bath is led in a first circuit via a diluate container. For this purpose, solution guiding means (pipelines, hoses) are provided between the container in which the deposition bath is located and the diluate container. For example, the deposition solution is circulated by suitable pumps continuously from the bath container into the diluate container, and from there back into the bath container. The solution contained in the diluate container is led in a second circuit through the diluate compartments in the first and the second electrodialysis unit, and from there back again. The solution is therefore transported via the diluate container into the diluate compartments of the electrodialysis units and not directly from the bath container into the electrodialysis units. By this means, greater flexibility of the plant is achieved, since the volume flow (circulating volume of liquid per time unit) can be adjusted in the two circuits independently of one another.

In a particularly preferred embodiment, the volume flow in the second circuit is set higher than the volume flow in the first circuit by at least one order of magnitude. The volume flow in the first circuit is preferably even at the most 1% of the volume flow in the second circuit. What is thereby achieved is that only a small volume flow of the bath solution which is regularly heated up to a high temperature has to be cooled, so that the heat-sensitive ion-exchange membranes and installation parts in the electrodialysis units are not destroyed, and subsequently heated up again. In this way, low heat losses are achieved such that a heat exchanger can possibly be dispensed with. For continuous removal of disturbing substances from the deposition solution, a relatively large liquid volume flow is continually led through the diluate compartments. The liquid is cooled during transfer into the diluate container. Special heat-exchangers are not required for this. Since only a small volume flow is conveyed into the diluate container, only a little heat has to be taken from the bath solution and added again during the return. Thus, the heat loss is low.

The diluate container can, moreover, be used to track the bath components used up during the metal deposition, namely nickel and hypophosphite ions. Through metering corresponding substances, for example, nickel sulphate and sodium hypophosphite, into the diluate container, these substances can be completely mixed with the deposition solution flowing through, before the solution enriched with these substances enters the bath container again. If these substances are added directly to the bath container, there is the danger that nickel is deposited in metallic form on container fittings or walls, since with the addition of the salts, locally increased concentrations of these substances are formed.

In addition, a concentrate container can be provided from which the concentrate solution is led into the concentrate compartments in the electrodialysis stack and from there back again to the concentrate container. In order to maintain a suitable concentration of the constituents of the concentrate solution, there is preferably disposed in the concentrate container a water supply, with which dilution of the solution is possible. Through the passage of the disturbing substances out of the diluate into the concentrate, these substances accumulate continuously in the concentrate, such that dilution becomes necessary. The supply of water is controlled, for example, by the electrical conductivity of the concentrate solution. The NaOH solution is also metered into this container.

The monoselective ion-exchange membranes mentioned here are those ion-exchange membranes which only allow ions with a single charge to pass, monoselective cation-exchange membranes, i.e. sodium and hydronium ($H_3O^*$) ions, and monoselective anion-exchange membranes, for example hypophosphite, hydroxide and carboxylic acid anions, whilst these membranes are substantially impermeable to multiply charged ions, i.e. nickel, sulphate and orthophosphite ions. If reference is only made to anion- or cation-exchange membranes, without referring to monoselective properties, these are those ion-exchange membranes which have no selectivity in respect of the number of charges of the ions passing.

BRIEF DESCRIPTION OF DRAWINGS

The invention is explained in greater detail below with the aid of figures. These show in detail.

Figure 1:
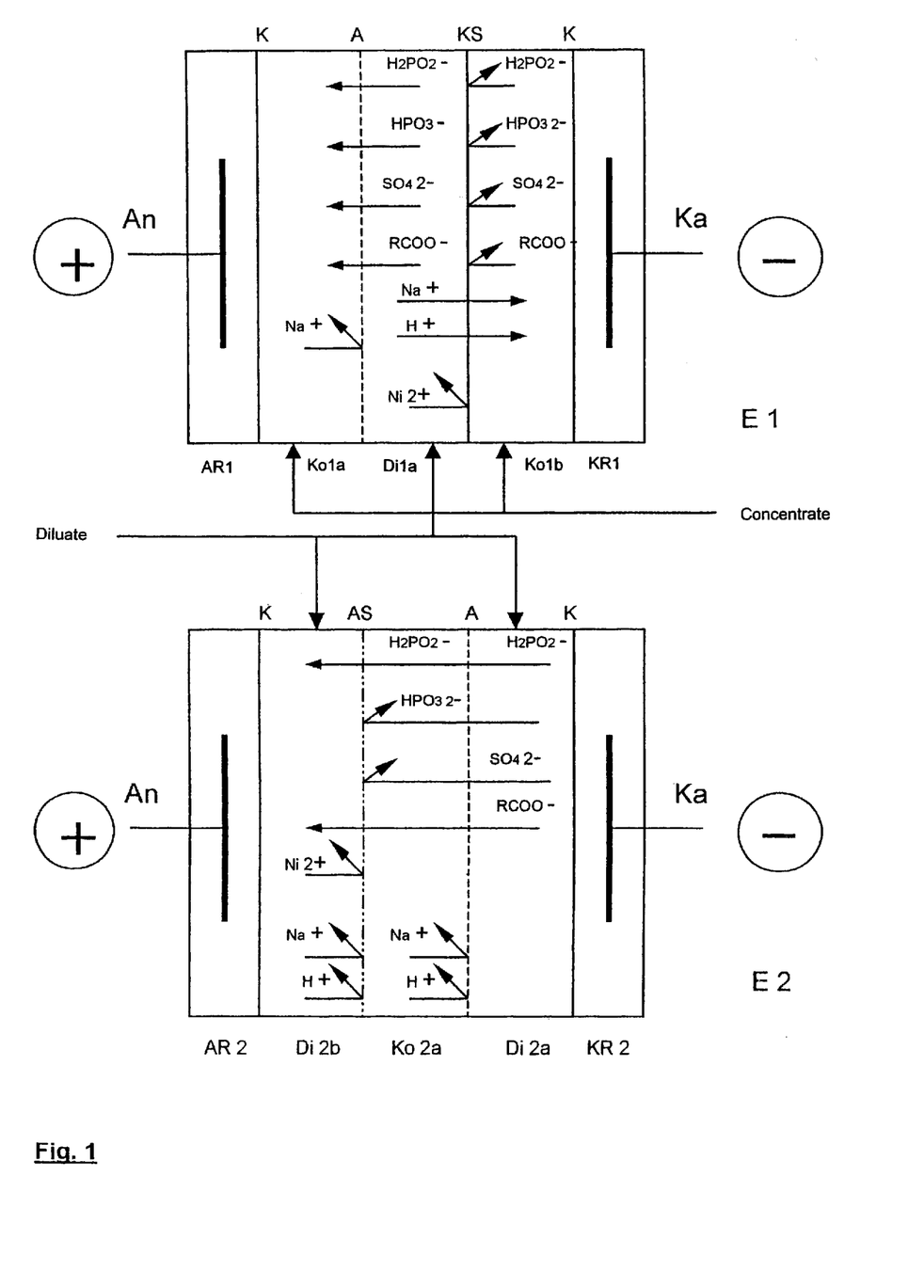
FIG. 1: a schematic representation of the partial processes in the first and in the second electrodialysis unit.

In FIG. 1, the basic structure of the electrodialysis units in the simplest embodiment is represented schematically. In both cases, anodes An and cathodes Ka are contained in the corresponding anode compartments AR1, AR2 or respectively the corresponding cathode compartments KR1, KR2. In these compartments is located exchangeable electrolyte solution, preferably a sodium sulphate solution.

The anode or cathode compartments are separated from the adjacent electrolyte compartments by cation-exchange membranes K. Membranes of this type, just as the remaining ion-exchange membranes used, are freely available, for example from the company DuPont de Nemours, U.S.A.

The diluate solution flows through all the diluate compartments Di and the concentrate solution through all the concentrate compartments Ko. This is indicated schematically by the arrows.

In the electrodialysis unit E1, which is represented schematically in the upper portion of FIG. 1, a first concentrate compartment Ko1$a$ communicates with the anode compartment AR1. The two compartments are separated from one another by a cation-exchange membrane K. Through the concentrate compartment Ko1$a$ flows the concentrate solution, preferably a slightly alkaline solution which, during operation, contains the substances which are taken up from the diluate solution (for example orthophosphite, sulphate, sodium ions). This first concentrate compartment is delimited on the cathode side by an anion-exchange membrane A. Towards the cathode, a diluate compartment Di1$a$, through which the diluate solution flows, communicates with the concentrate compartment Ko1$a$. On the cathode side, a concentrate compartment Ko1$b$, through which the concentrate solution flows, communicates in turn with the diluate compartment. Compartments Di1$a$ and Ko1$b$ are separated from one another by a monoselective cation-exchange membrane KS. The concentrate compartment Ko1$b$ is divided from the adjacent cathode compartment KR1 by a cation-exchange membrane K.

Sodium ions contained in the concentrate compartment Ko1$a$ are not transferred into the diluate compartment Di1$a$. In the diluate solution are found, in the case of a typical nickel/phosphorus deposition bath, nickel, sodium, hypophosphite ($H_2PO_2^-$), orthophosphite ($HPO_3^{2-}$), sulphate and carboxylic acid ($RCOO^-$) ions. Of the types of ions located in the diluate compartment Di1$a$, all the anions, i.e. hypophosphite, orthophosphite, sulphate and carboxylic acid anions are transferred through the anion-exchange membrane A into the concentrate compartment Ko1$a$, and of the cations, the singly charged sodium and hydronium ions are transferred through the monoselective cation-exchange membrane KS into the concentrate compartment Ko1$b$. On the other hand, the double-charged nickel ions are not transferred into the concentrate compartment Ko1$b$ but remain in the diluate compartment. Hydroxide ions, possibly contained in the concentrate compartment Ko1$b$ in a low concentration, cannot pass into the diluate compartment. The same is also true for the hypophosphite, orthophosphite, sulphate and carboxylic acid ions.

In the overall balance of the electrodialysis unit E1, therefore, all the anions are transferred into the concentrate compartment, whilst of the cations only the sodium ions and the hydronium ions pass into the concentrate compartment, but not the nickel ions.

In the electrodialysis unit E2, which is represented schematically in the lower portion of FIG. 1, a first diluate compartment Di2$b$ communicates with the anode compartment AR2. The anode compartment is delimited on the cathode side by a cation-exchange membrane K. The diluate solution flows through this diluate compartment. The diluate compartment is delimited on the cathode side by a monoselective anion-exchange membrane AS. On the cathode side, there adjoins a concentrate compartment Ko2$a$, through which the concentrate solution flows. This compartment is divided by an anion-exchange membrane A from an adjacent second diluate compartment Di2$a$, through which the diluate solution flows. This second diluate compartment Di2$a$ is divided on the cathode side from the adjoining cathode compartment KR2 by means of a cation-exchange membrane K.

Cations cannot pass from the first diluate compartment Di2$b$ into the adjoining concentrate compartment Ko2$a$, since the two compartments are separated from one another by a monoselective anion-exchange membrane AS.

Equally, sodium ions contained in the concentrate compartment cannot pass into the second diluate compartment Di2$a$, since in this case the transfer of sodium ions is opposed by an anion-exchange membrane. Anions contained in the second diluate compartment Di2$a$, namely hypophosphite, orthophosphite, sulphate, carboxylic acid and hydroxide ions, are transferred into the central concentrate compartment Ko2$a$. Of the anions which have reached the concentrate compartment, only the singly charged anions can pass through the monoselective anion-exchange membrane AS into the diluate compartment Di2$b$, namely hypophosphite, carboxylic acid and hydroxide ions.

In the overall balance of the partial processes running in this electrodialysis unit, the disturbing bath constituents are thus selectively transferred into the concentrate compartment, whilst the valuable substances are returned again to the diluate solution after passing the concentrate compartment.

Figure 2:
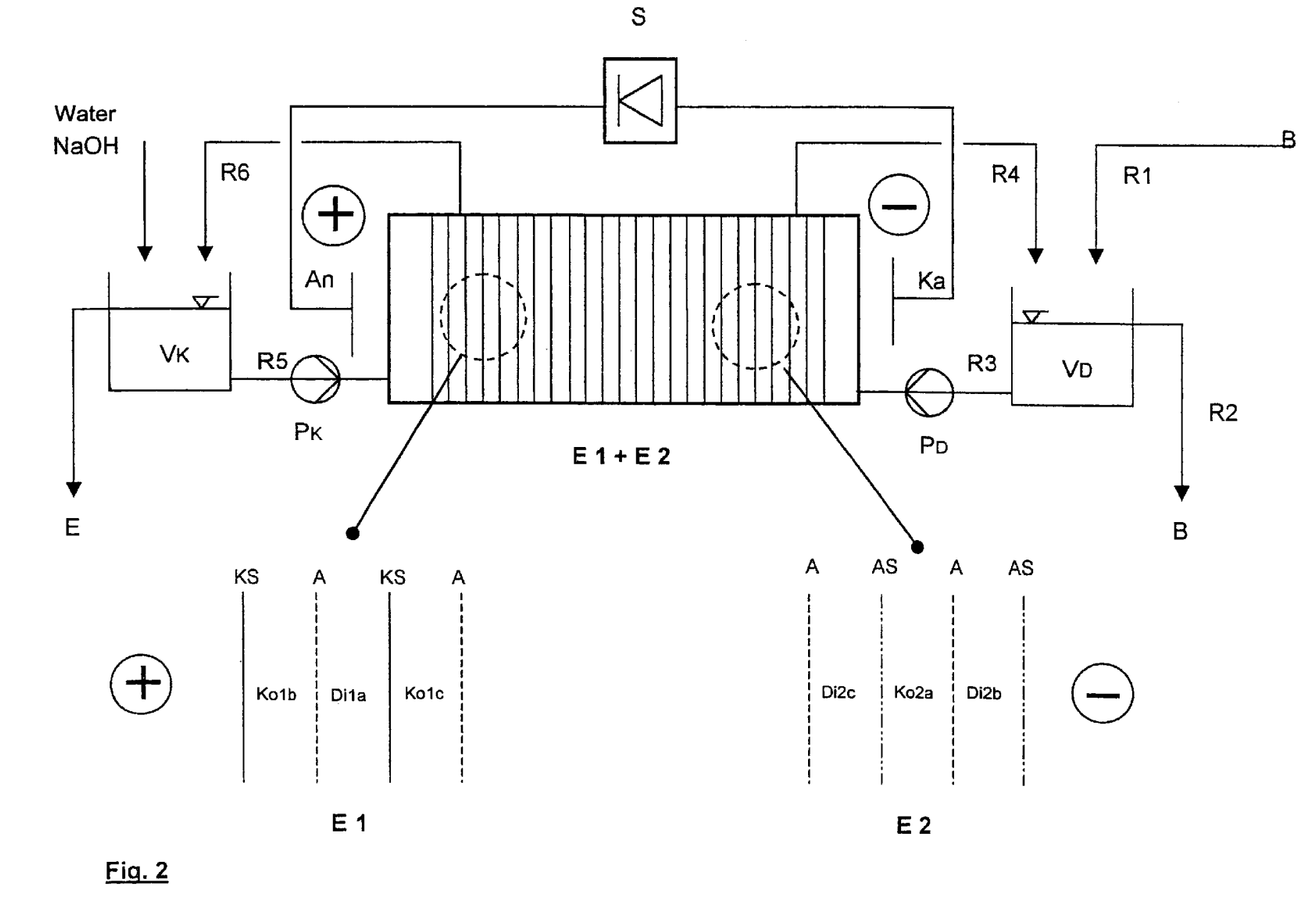
FIG. 2: a schematic representation of a first embodiment of the device according to the invention.

The electrodialysis unit according to the invention comprises two electrodialysis stacks E1 and E2, as shown in FIG. 2. These are shown in the detail in the lower portion of FIG. 2, separately enlarged as a basic unit. The two stacks are combined into a common stack. The electrodes are attached to the end faces of the common stack, in FIG. 2 on the left-hand side an anode An and on the right-hand side the cathode Ka. As the anode is used, for example, a stainless steel plate or titanium coated with noble metal mixed oxides or platinum-plated. A plate of the same material can be used for the cathode. The individual electrodialysis cells within the stack comprise respectively specially shaped frames which leave the diluate compartments Di or concentrate compartments Ko free and have ducts in order to permit a guided flow of the diluate solution, on the one hand, and of the concentrate solution on the other hand, through the individual compartments. The ducts are here so formed that the liquid coming from the diluate container $V_D$ can enter simultaneously all the diluate compartments Di and the liquid coming from the concentrate container $V_K$ can enter simultaneously all the concentrate compartments Ko.

Furthermore, seals are contained in the stack in order to prevent any escape of liquid from the stack or passing of liquid from one compartment to an adjacent compartment. On the end surfaces are provided force-absorbing plates, made of steel for example. The whole stack is screwed by means of bolts, which extend through the entire stack, or tensioned hydraulically.

The whole stack has, moreover, the ion-exchange membranes which are required for separating the types of ion and which separate the individual compartments from one another. The electrodialysis unit E1 comprises diluate compartments Di1a, Di1b, Di1c, . . . , Di1x, and concentrate compartments Ko1a, Ko1b, Ko1c, . . . , Ko1x, disposed alternating with one another. Towards the cathode side, the diluate compartments are separated from the concentrate compartments by monoselective cation-exchange membranes KS and towards the anode side by anion-exchange membranes A. The anode An is in direct contact with the outer compartment of the electrodialysis unit E1 on the anode side. This is the anode compartment here. The anode compartment is separated from the adjacent concentrate compartment Ko1a by a cation-exchange membrane K.

At the outer concentrate compartment Ko1x on the cathode side, electrodialysis unit E1 is connected with electrodialysis unit E2. The connection point is provided by an anion-exchange membrane A. On the cathode side is located, adjacent to this anion-exchange membrane, a diluate compartment Di2x of unit E2. In this electrodialysis unit E2, the diluate compartments Di2x, . . . , Di2c, Di2b, Di2a and the concentrate compartments Ko2x, . . . , Ko2c, Ko2b, Ko2a alternate with one another. For example, two diluate compartments Di1 and three concentrate compartments Ko1 can be combined in electrodialysis unit E1 and three diluate compartments Di2 and two concentrate compartments Ko2 can be combined in electrodialysis unit E2.

Each diluate compartment Di2 is separated from the adjacent concentrate compartments Ko2 by an anion-exchange membrane A towards the anode side and by a monoselective anion-exchange membrane AS towards the cathode side.

The cathode Ka is in direct contact with the outer compartment on the cathode side of electrodialysis unit E2. This is the cathode compartment. The cathode compartment is separated from the adjacent diluate compartment Di2a by a cation-exchange membrane.

The anode An and the cathode Ka are connected with a rectifying power supply S.

The bath solution is pumped, coming from the bath container B, via a pipeline $R_1$, into the diluate container $V_D$, for example with a volume flow of 20 l/h. The solution in the container $V_D$ is led via a further pipeline $R_2$ back into the container B. In the diluate container $V_D$, the nickel/phosphorus deposition solution, entering at a temperature of, for example, 90° C., cools down to a temperature of 40° C., for example.

From the diluate container, the deposition solution is conveyed by means of a pump $P_D$ via a pipeline $R_3$ into all the diluate compartments Di1 and Di2 of the electrodialysis units E1 and E2. The volume flow is for example 7 m³/h. After the solution has passed through the diluate compartments, it returns via pipeline $R_4$ to the diluate container.

A concentrate solution flows through the concentrate compartments Ko1 and Ko2 of the two electrodialysis units. The concentrate solution is located in the concentrate container $V_K$. The solution is conveyed by means of a pump $P_K$ via pipeline $R_5$ simultaneously into all the concentrate compartments. After the solution has passed through these compartments, it returns to the concentrate container via pipeline $R_6$. Since the disturbing substances located in the deposition solution, such as orthophosphite, sulphate and sodium ions, constantly accumulate in the concentrate solution, the latter must be continuously diluted in order to prevent any inhibition of the transfer of these types of ion through the ion-exchange membranes. To this end, water is added to the concentrate container continuously or intermittently.

In order, furthermore, to set an optimal pH value for the selective transfer of orthophosphite ions in the concentrate solution, the pH value of the concentrate solution is set at values above 8.5 by adding sodium hydroxide to the solution. This hydroxide must be continuously added since hydroxide ions are used up by conversion of $HPO_3^{2-}$ into $H_2PO^{3-}$ and are thus lost from the concentrate solution.

In a further embodiment (FIG. 3) the electrodialysis units E1 and E2, shown as per FIG. 2, are used. The two units are also combined in a common stack, however in the manner that the cathode sides of the two units adjoin one another and a cathode Ka is disposed between the two individual stacks. In this case, the sequence of the anion-exchange membranes in electrodialysis unit E2 is reversed.

Figure 3:
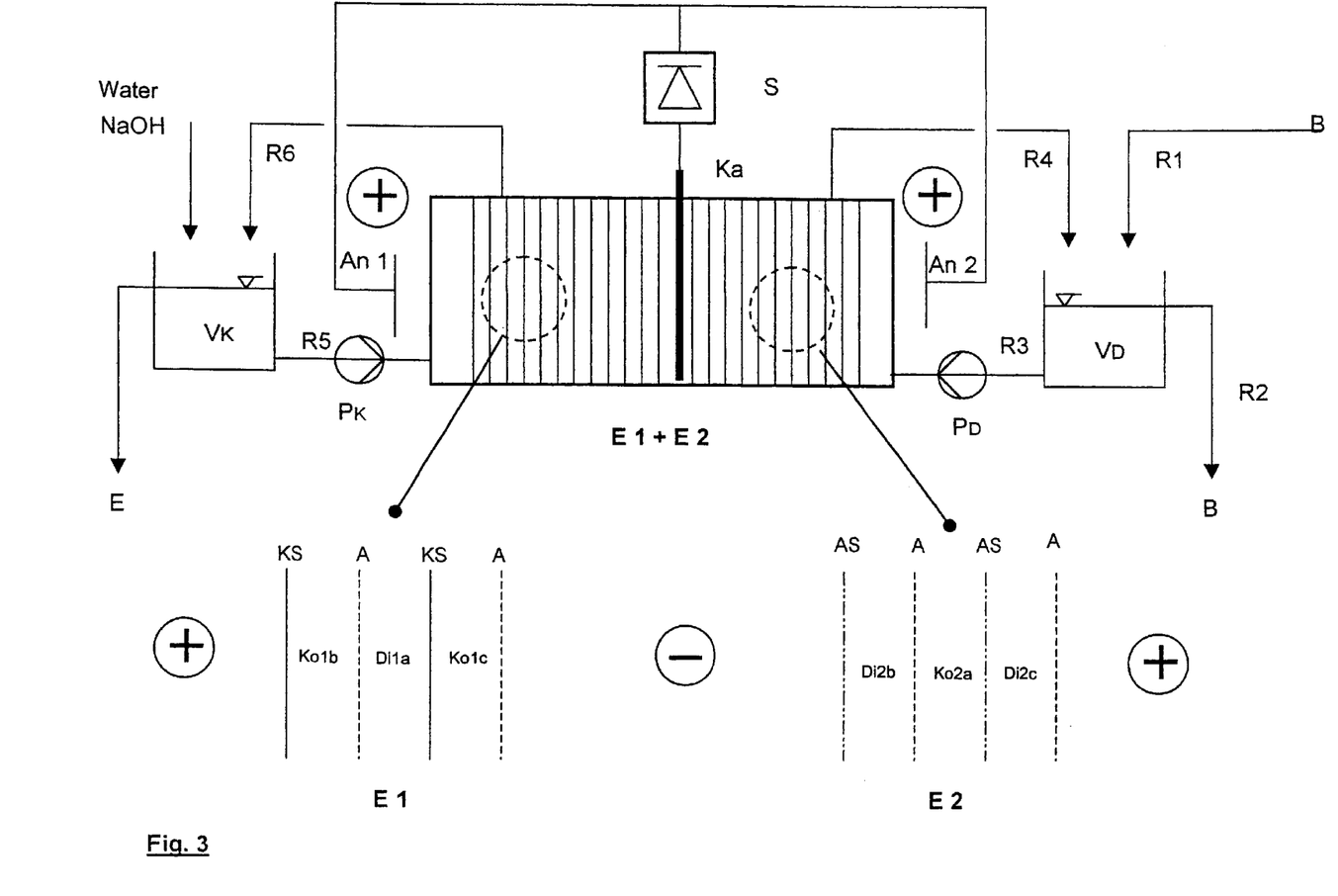
FIG. 3: a schematic representation of a second embodiment of the device according to the invention.

In this case, too, cation-exchange membranes are provided between the cathode compartments and the adjoining electrolyte compartments on the one hand, and between the anode compartments and the adjoining electrolyte compartments on the other hand.

To supply power, again a rectifier is used which supplies both electrodialysis stacks simultaneously, by the two stacks being electrically connected to one another in parallel. The electrical circuit through the cathode Ka and the anode $An_1$ is connected in parallel with the electrical circuit through the cathode Ka and the anode $An_2$.

The remaining elements of the device are identical with those of the first embodiment.

An example is quoted below to further clarify the invention:

Nickel/phosphorus alloy layers were deposited from a suitable bath onto steel plates. The nickel/phosphorus bath initially had the following composition:

| | |
|---|---|
| $Na^+$ (from $NaH_2PO_2$) | 6.5 g/l |
| $Ni^{2+}$ (from $NiSO_4$) | 7.0 g/l |
| $HPO_3^{2-}$ (formed by oxidation from hypophosphite) | 0 g/l |
| $H_2PO_2^-$ (from $NaH_2PO_2$) | 18 g/l |
| $SO_4^{2-}$ (from $NiSO_4$) | 12 g/l |
| Lactic acid | 30 g/l |
| Propionic acid | 5 g/l |
| $Pb^{2+}$ from $Pb(NO_3)_2$ | 2 mg/l |
| With the following characteristics: | |
| pH value | 4.6 |
| Temperature | 85° C. |
| Deposition speed | 12 to 14 µm/h |

After ageing of the bath to 5.6 MTO, the bath was exhausted and had the following concentrations or parameters:

| | |
|---|---|
| Na$^+$ | 46 g/l |
| Ni$^{2+}$ | 6 g/l |
| HPO$_3^{2-}$ | 134 g/l |
| H$_2$PO$_2^-$ | 18 g/l |
| SO$_4^{2-}$ | 66 g/l |
| pH value | 5.0 |
| Temperature | 90° C. |
| Deposition speed | 5 µm/h |

After the ageing of the bath, the quality of the nickel/phosphorus coating had sunk to a limit which was no longer acceptable. The bath therefore had to be thrown away.

In a second test, a bath was operated with the above-quoted initial composition and continuously regenerated using the device represented in FIG. 2. The conditions are quoted below:

| | |
|---|---|
| Bath container volume | 1 m$^3$ |
| Bath load (metal surface to be coated per bath volume) | 10 m$^2$/m$^3$ |
| Volume flow from bath to diluate container | 30 l/h |
| Volume flow from diluate container to electrodialysis unit | 6000 l/h |
| Heat losses | 0.8 kW |
| Electrical power consumption | 4.2 kW |

Through the comparatively low volume flow from the bath to the diluate container, expensive and high-loss heat exchange for cooling the bath and later re-heating of the returned solution was avoided. It was only necessary to lead away the electrical power used for the electrodialysis in order not to exceed the maximum admissible temperature in the electrodialysis stack. For this cooling, rinsing water of a hot water rinse was used which was needed in the treatment of metal surfaces to be nickel-plated and had to be heated up anyway.

The concentrations of the individual bath constituents and the bath parameters could here be kept constantly at the following values:

| | |
|---|---|
| Na$^+$ | 24 g/l |
| Ni$^{2+}$ | 7.0 g/l |
| HPO$_3^{2-}$ | 60 g/l |
| H$_2$PO$_2^-$ | 18 g/l |
| SO$_4^{2-}$ | 36 g/l |
| pH value | 4.7 |
| Temperature | 88° C. |
| Deposition speed | 12 µm/h |

The composition of the bath obtained corresponded, proceeding from the newly started bath, to a deposition bath with an age of roughly 2 to 3 MTO.

What is claimed is:

1. Method for regenerating by electrodialysis an electroless metal deposition bath, containing hypophosphite ions as the reducing agent, in which the liquid of the bath is led through diluate compartments (Di1a, Di1b, . . . , Di1x) in a first electrodialysis unit (E1) having cathodes (Ka) and anodes (An), which compartments are separated from concentrate compartments (Ko1a, Ko1b, . . . , Ko1x) in the electrodialysis unit (E1) on the cathode side by monoselective cation-exchange membranes (KS) and on the anode side by anion-exchange membranes (A), the diluate compartments (Di1a, Di1b, . . . , Di1x) and the concentrate compartments (Ko1a, Ko1b, . . . , Ko1x) being disposed alternately to one another, characterised in that the bath solution is led simultaneously through diluate compartments (Di2a, Di2b, . . . , Di2x) in a second electrodialysis unit (E2) having cathodes (Ka) and anodes (An, An$_2$), which compartments are separated from concentrate compartments (Ko2a, Ko2b, . . . , Ko2x) in the second electrodialysis unit (E2) on the cathode side by monoselective anion-exchange membranes (AS) and on the anode side by anion-exchange membranes (A), the diluate compartments (Di2a, Di2b, . . . , Di2x) and the concentrate compartments (Ko2a, Ko2b, . . . , Ko2x) in the second electrodialysis unit (E2) being disposed alternately to one another.

2. Method according to claim 1, characterised in that a concentrate solution is led simultaneously through the concentrate compartments (Ko2a, Ko2b, . . . , Ko2x).

3. Method according to one of the preceding claims, characterised in that the first electrodialysis unit (E1) and the second electrodialysis unit (E2) are combined in a common electrodialysis stack and so disposed that a cathode (Ka) is disposed only on one end face of the common electrodialysis stack, and an anode (An) on the other.

4. Method according to one of claims 1 and 2, characterised in that the first electrodialysis unit (E1) and the second electrodialysis unit (E2) are combined in a common electrodialysis stack and so disposed,
   a. that between the two electrodialysis units (E1, E2), a common cathode (Ka) is disposed and respectively one anode (An$_1$, An$_2$) on the two end faces of the common electrodialysis stack (E1, E2), or
   b. that between the two electrodialysis units (E1, E2) a common anode (An) is disposed and respectively one cathode (Ka) on the two end faces of the common electrodialysis stack (E1, E2).

5. Method according to one of the preceding claims 1 and 2, characterised in that the bath solution of the deposition bath is led in a first circuit via a diluate container (V$_D$) and the liquid contained in the diluate container (V$_D$) is led in a second circuit through the diluate compartments (Di1a, Di1b, . . . , Di1x, Di2a, Di2b, . . . , Di2x) in the first and the second electrodialysis unit (E1, E2), the volume flow in the second circuit being greater than the volume flow in the first circuit by at least one order of magnitude, preferably by at least two orders of magnitude.

6. Method for regenerating by electrodialysis an electroless nickel deposition bath containing hypophosphite ions as the reducing agent, according to one of the preceding claims 1 and 2.

7. Device for regenerating by electrodialysis an electroless metal deposition bath containing hypophosphite ions as the reducing agent, the device containing
   a. a first electrodialysis unit (E1) containing two concentrate compartments (Ko1a, Ko1b) and a diluate compartment (Di1a), disposed between same, as electrolyte compartments, the diluate compartment (Di1a) being separated on the cathode side from the one concentrate compartment (Ko1b) by a monoselective cation-exchange membrane (KS) and being separated on the anode side from the other concentrate compartment (Ko1a) by an anion-exchange membrane (A),
   b. in the first electrodialysis unit (E1) at least one cathode (Ka) and at least one anode (An) and
   c. a power supply (S) for the cathodes (Ka) and the anodes (An, An$_1$), characterised by
   d. a second electrodialysis unit (E2) containing two diluate compartments (Di2a, Di2b) and a concentrate compartment (Ko2a), disposed between same, as electrolyte compartments, the concentrate compartment (Ko2a) being separated on the cathode side from the one diluate compartment (Di2a) by an anion-exchange membrane (A) and being separated on the anode side from the other diluate compartment (Di2b) by a monoselective anion-exchange membrane (AS), as well as at least one cathode (Ka) and at least one anode (An, $An_2$) and a power supply (S) for the cathodes and the anodes.

8. Device according to claim 7, characterised in that in the first electrodialysis unit (E1) respectively at least two diluate compartments (Di1a, Di1b) and at least three concentrate compartments (Ko1a, Ko1b, Ko1c) are disposed alternately to one another, and in the second electrodialysis unit (E2) respectively at least two concentrate compartments (Ko2a, Ko2b) and at least three diluate compartments (Di2a, Di2b, Di2c) are disposed alternately to one another.

9. Device according to one of claims 7 and 8, characterised in that the concentrate compartments (Ko1a, Ko1b, . . ., Ko1x) in the first electrodialysis unit (E1) are delimited on the cathode side by anion-exchange membranes (A) and on the anode side by monoselective cation-exchange membranes (KS), with the proviso that the electrolyte compartments (KR1, AR1) in contact with the cathodes (Ka) or the anodes (An, $An_1$) are separated from the adjacent electrolyte compartments by cation-exchange membranes (K).

10. Device according to one of claims 7 and 8, characterised in that the concentrate compartments (Ko2a, Ko2b, . . . , Ko2x,) in the second electrodialysis unit (E2) are delimited on the cathode side by anion-exchange membranes (A) and on the anode side by monoselective anion-exchange membranes (AS), with the proviso that the electrolyte compartments (KR2, AR2) in contact with the cathodes (Ka) or the anodes (An, $An_2$) are separated from the adjoining electrolyte compartments by cation-exchange membranes (K).

11. Device according to one of claims 7 and 8, characterised in that first liquid guiding means ($R_1$, $R_2$) are provided, by means of which the liquid of the bath may be led in a first circuit through a diluate container ($V_D$), and in addition second liquid guiding means ($R_3$, $R_4$), by means of which the liquid in the diluate container ($V_D$) may be led in a second circuit from the diluate container ($V_D$) through the diluate compartments (Di1, Di2) in the first (E1) and in the second (E2) electrodialysis unit and from there back again.

12. Device according to one of claims 7 and 8 characterised in that the first electrodialysis unit (E1) and the second electrodialysis unit (E2) are combined in a common electrodialysis stack and so disposed, that a cathode (Ka) is disposed only on one end face of the common electrodialysis stack, and an anode (An) on the other one.

13. Device according to one of claims 7 and 8 characterised in that the first electrodialysis unit (E1) and the second electrodialysis unit (E2) are combined in a common electrodialysis stack and so disposed,
   a. that a common cathode (Ka) is disposed between the two electrodialysis units and respectively one anode ($An_1$, $An_2$) on the two end faces of the common electrodialysis stack, or
   b. that between the two electrodialysis units is disposed a common anode (An) and respectively one cathode (Ka) on the two end faces of the common electrodialysis stack.

* * * * *

UNITED STATES PATENT AND TRADEMARK OFFICE
CERTIFICATE OF CORRECTION

PATENT NO. : 6,379,517 B1
DATED : April 30, 2002
INVENTOR(S) : Jens Heydecke et al.

It is certified that error appears in the above-identified patent and that said Letters Patent is hereby corrected as shown below:

Column 4,
After line 34, insert the following missing paragraph -- The problem is solved by the method according to claim 1 and the device according to claim 7. Preferred embodiments of the invention are quoted in the subordinate claims --.

Column 5,
Line 7, "prior to "in each" insert -- c. --.

Signed and Sealed this

Sixth Day of July, 2004

JON W. DUDAS
*Acting Director of the United States Patent and Trademark Office*